United States Patent Office 3,218,338
Patented Nov. 16, 1965

3,218,338
METHOD OF MAKING ORGANIC
CARBONATING AGENTS
Jacob R. Feldman, New York, N.Y., and Rodger L. Foltz, Columbus, Ohio, assignors, by direct and mesne assignments, to General Foods Corporation, White Plains, N.Y., a corporation of Delaware
No Drawing. Filed Dec. 13, 1962, Ser. No. 244,260
9 Claims. (Cl. 260—340.2)

This invention relates to the synthesis of organic carbonating agents and, more particularly, to the preparation of O-carboxy anhydrides of alpha-hydroxy acids in a form which will readily hydrolyze in water to produce $CO_2$.

In British Patent No. 650,003 published February 7, 1951, H. A. Davies described the manufacture of O-carboxy anhydrides of certain alpha-hydroxy acids, to-wit, glycolic and lactic. Specifically, anhydro-O-carboxy lactic acid or anhydro-O-carboxy glycolic acid are said to be produced by reaction of phosgene (carbonyl dichloride) with lactic acid or glycolic acid, respectively, dissolved in dioxane as the solvent. According to the procedure of Davies, the reaction using either glycolic or lactic acid proceeds in stages. Initially, the alpha-hydroxy acid is allowed to react with phosgene in the presence of dioxane at a temperature of 15°–20° C. for a period of 3 days to produce a chloroformate intermediate. The solvent is then distilled off at 40° C. under reduced pressure and the chloroformate in the residual oil is cyclised by heating for 3 hours at a temperature of 60° C. at a reduced pressure. The crude cyclised product may then be purified by crystallization from ethyl ether.

The process of the Davies publication suffers from the disadvantages of long reaction time and low yield of final product by weight of the theoretical yield projected. It appears that due to the slow rate of reaction in the solvent disclosed, undesirable interactions between the solvent and the reagents occur which form chemical complexes that interfere with the efficiency of the desired reaction.

The present invention, therefore, has for its object the formation of O-carboxy anhydrides of alpha-hydroxy acids at an accelerated rate and in a significantly increased yield over that previously realized. In following the present invention these objects are met in a manner which produces the desired reaction product quite rapidly while affording a dramatic improvement in yield and purity of product.

The invention resides in the discovery that these objects are met by reacting an alpha-hydroxy carboxylic acid with phosgene (carbonyl dichloride) in tetrahydrofuran or a homologue or derivative thereof as a solvent for the reagents, said phosgene being dissolved in an amount which is in excess of the stoichiometric amount necessary for the reaction, carrying out the reaction at a temperature which inhibits the formation of undesirable side reactions while producing the desired O-carboxy anhydride of alpha-hydroxy acid, and separating the anhydride from the solvent and unreacted phosgene.

The exact nature of the alpha-hydroxy carboxylic acid and the subsequent purification of the O-carboxy anhydride produced by this reaction will in many instances depend upon the requisite physical and chemical characteristics of the reaction product for the use intended. In the food art where the O-carboxy anhydride is intended for use in a dry and relatively stable form such as may be required in compounding a dry beverage composition, it will be desired to obtain a derivative having a relatively high melting point. This characteristic will in turn be dependent upon the specific alpha-hydroxy acid which is used. In the case of lactic acid, a relatively high melting point derivative will be obtained by employing an optically active isomer (either the D or the L form) while a relatively low melting point derivative will be obtained when using an optically inactive racemic mixture of lactic acid (D,L form). In the case of other alpha-hydroxy acids, to-wit, tartaric acid, it would appear that various of the isomers thereof advantageously produce O-carboxy anhydride in a relatively stable form incident to the removal of the tetrahydrofuran solvent and the phosgene from the reaction mixture. Hence, since relatively stable anhydride crystals of the tartaric derivative are produced in the residual oil, the use of certain solvents for such oil may be required simply to facilitate isolation.

The molecular structure of the anhydro-O-carboxy acid will vary in accordance with the character of the alpha-hydroxy acid reagent. However, the anhydride will have the following formula:

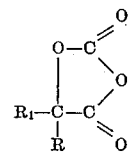

wherein R and $R_1$ are hydrogen; a carboxylated alkyl, aryl, or aralkyl substituent; a halogen group such as fluorine or chlorine; an alkyl group such as methyl or ethyl; a heterocyclic group such as a pyridyl; an alicyclic group such as cyclohexyl; an aryl group such as phenyl; an aralkyl group such as benzyl; or an alkoxy group such as methoxy.

Typical of the various alpha-hydroxy acids that can be used are glycolic, lactic, alpha-hydroxy butyric and homologues thereof, and alpha-hydroxy derivatives of dibasic acids such as tartaric or malic. Depending upon the alpha-hydroxy acid employed the anhydride product produced may be monocyclic (glycolic or lactic acid) or bicyclic (tartaric acid).

In the case where lactic acid is the monobasic alpha-hydroxy acid, the cyclic anhydride will have the following structural formula:

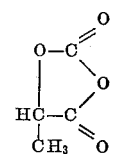

In the case of a dibasic alpha-hydroxy acid, such as tartaric acid, the compound will have the following chemical structure:

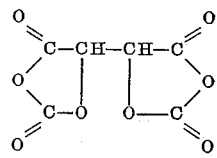

The tetrahydrofuran of the present invention is commonly understood to have the following chemical structure:

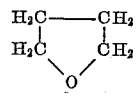

In accordance with its more generic aspects the solvent of this invention may be designated:

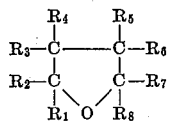

wherein $R_1$ through $R_8$ and any combination of these may be any of the aforesaid radicals such as hydrogen, a halogen, an alkoxy such as methoxy, an alkyl, an aryl, and an aralkyl substituent. A wide variety of tetrahydrofuran homologues and derivatives may be used depending upon the relative solubility of the alpha-hydroxy acid employed. Generally, the tetrahydrofuran or its homologue should have a sufficiently low boiling point to enable its ready removal from the crude residual oil containing the reaction product. For some cyclic anhydride derivatives, the temperature at which the solvent is removed will be dictated by the stability of the anhydride produced. In the case of the tartaric and lactic acid anhydride, tetrahydrofuran is preferred.

It has been found that the yield of desired anhydride reaction product varies inversely with the water content of the reaction mixture. Accordingly, in accordance with its more preferred aspects, the invention involves placing a substantially anhydrous (i.e., less than 3% by weight water) form of alpha-hydroxy acid, e.g., lactic, hydroxybutyric, tartaric, malic, etc., and a substantial excess of phosgene completely in solution with tetrahydrofuran or a homologue of tetrahydrofuran. However, acids having moisture levels as high as 15% have been used but with a concomitant sacrifice in yield.

Typically, about 3–4 moles of phosgene are used for each mole of lactic acid and about 7–9 moles of phosgene are used for each mole of tartaric acid. A level of phosgene in excess of that stoichiometrically required is preferred to inhibit the formation of side-reaction products and to insure anhydrous reaction conditions. The use of tetrahydrofuran or a homologue of tetrahydrofuran as the solvent allows the reactants to dissolve quite readily in the solvent medium and the reaction is then allowed to proceed at a temperature of below 40° C., preferably 0°–20° C., although higher reaction temperatures may also be practiced with a corresponding reduction in process time. At the low temperatures employed the reaction proceeds efficiently with a minimum of side reactions to provide a final product of improved yield and purity. Of course, higher reaction temperatures may be employed if it is desired to accelerate the reaction time.

The O-carboxy anhydride of lactic acid is preferably isolated by crystallization from an aprotic solvent, such as ethyl ether, after the excess phosgene and tetrahydrofuran are volatilized from the reaction mixture. The bis-O-carboxy anhydride of tartaric acid may also be isolated by such crystallization techniques.

In the case of the lactic acid derivative the optimum time and temperature for producing the reaction product is 3–6 hours at 0° to 10° C. Shorter reaction times or lower temperatures do not allow completion of the reaction, and higher temperatures or longer reaction times increase the degree of side reactions, but variations from these preferred times and temperatures may be practiced in accordance with the objects of the invention. Preferably the tetrahydrofuran and excess phosgene (e.g., 3–4 moles per mole of lactic) which does not enter into the reaction should be volatilized under subatmospheric pressure at a temperature of 30°–40° C.

In the case of the tartaric acid derivative, an even larger excess of phosgene (7–9 moles of phosgene per mole of tartaric) is preferably used and a longer reaction time is practiced at reaction temperatures of 0°–20° C., typically from 16–24 hours. Similar to the lactic acid derivative, shorter reaction times and/or lower reaction temperatures do not allow the reaction to go to completion, and higher temperatures or longer reaction times increase the degree of side reactions thus limiting the yield and purity of the final product. The removal of tetrahydrofuran and excess phosgene should be accomplished at temperatures below 30° C., preferably 15°–20° C.

In the case of the tartaric and lactic acid derivatives, when all the phosgene and solvent have been volatilized, a crude syrupy residue will be obtained. About 1–5 parts by weight of anhydrous diethyl ether as an aprotic solvent for each part of crude residue is added to the crude residue and the mixture cooled to below 0° C. The reaction product may be ultimately isolated in the form of substantially pure white crystals by filtration. The derivative may also be isolated from the residue by other techniques, e.g., addition of a less polar solvent to an ether solution of the product to cause precipitation thereof. In still other isolation techniques, as in the case of the lactic acid derivative, the residual syrupy reaction product may be vacuum distilled at a low temperature to recover a purified form of the anhydride.

Although the process of the present invention may be employed in preparing O-carboxy anhydrides of lactic acid from the optically inactive racemic mixture of D,L lactic acid, it has been found that a significant increase in the yield of the derivative is achieved when a highly purified, anhydrous, crystalline form of the optically active L(+) or D(−) lactic acid is used. Thus, although yields of 70% to 80% of O-carboxy anhydride of lactic acid can be obtained by using freshly distilled form of D,L lactic acid, greater yields of the anhydro carbonate (say in excess of 85%) can be readily achieved when the anhydrous crystalline L(+) or D(−) lactic acid is employed in the reaction process. While either optical isomer or a mixture of the two isomers of lactic acid may be used, it should be noted that when using the racemic mixture (optically inactive form) of lactic acid, a low melting derivative is obtained which is less preferred for some food processing purposes to the higher melting point derivative which is obtained by using either the D(−) or the L(+) optically active forms of lactic acid. The D,L lactic acid derivative melts at 28° C., while the D(−) and L(+) derivatives melt at 64° C.

Similar to the case of the lactic acid derivative, the tartaric acid derivative can also be synthesized in the solvent system of the present invention from the various stereo-isomers of tartaric acid, i.e., the L(+) form, the D(−) form, the meso form, or the racemic mixture of D(−) and L(+) forms; which derivatives are advantageously of a much higher melting point as recovered.

The invention will now be more fully described by reference to the following specific examples:

*Example I*

The following example describes the production of D,L-anhydro-O-carboxy lactic acid. 110 grams of liquid phosgene was added to 100 milliliters of anhydrous tetrahydrofuran, cooled by means of an ice bath to 0°–5° C. The phosgene was introduced through a tube placed below the surface of the solvent. The temperature of the solvent was maintained in the neighborhood of 5° C. during the phosgene addition. 30 grams (0.33 mole) of freshly distilled and optically inactive D,L− lactic acid containing about 2.0% by weight of water, was then slowly added with stirring to the phosgene solution over a period of 20 minutes. The rate of addition of lactic acid to the phosgene solution was kept sufficiently slow and gradual to maintain the temperature of the reaction mixture below 10° C. The resulting solution was also maintained at between 5° and 10° C. for about 3 hours, after which time excess phosgene and tetrahydrofuran were removed by distillation under reduced pressure (about 20 mm. Hg) using a rotary evaporator and a water bath kept at a temperature of 30°–35° C. After approximately one hour of such evaporation substantially all the volatile components of the mixture were removed. The resulting colorless syrup was vacuum distilled, a main fraction thereof being collected at a vapor temperature between 47° to 50° C. and an absolute pressure of 0.2 mm. Hg. The distillate upon cooling solidified to a crystalline magma. This product amounted to 29.1 gms. (yield 75.3% of theoretical) of anhydro-O-carboxy lactic acid reaction product. The anhydro-O-carboxy lactic acid magma was recrystallized in ethyl ether, the lactic derivative crystallizing from ether at a temperature of about 5° C. The resulting crystals had a melting point of 28° C.

*Example II*

The following example describes the production of the L(−) anhydro-O-carboxy lactic acid. Approximately 900 gms. (9.1 moles) of phosgene was dissolved in 400 ml. of anhydrous tetrahydrofuran according to the procedure of Example I while the temperature of the solvent was maintained below 5° C. as above. While stirring the cooled solution, about 300 gms. (3.3 moles) of anhydrous L(+) lactic acid having a melting point of 52° C. was dissolved in 500 ml. of tetrahydrofuran and this solution was slowly added over a period of 30 minutes. The reaction solution was allowed to stand with external cooling at temperatures of 5° to 10° C. for 3 hours. Excess phosgene and tetrahydrofuran were then removed by heating the solution to 30°–35° C. under reduced pressure until crystallization of the L(−) anhydro-O-carboxy lactic acid occurred. After cooling and filtering the crude product it was recrystallized from chloroform and ethyl ether at about 5° C. Recovery of pure L(−) anhydro-O-carboxy lactic acid crystals having a melting point of 64° C. amounted to 335 gms. (86.5% yield).

*Example III*

The following example describes the production of bis-O-carboxy anhydride of tartaric acid. Approximately 700 gms. (7.1 moles) of liquid phosgene was run into 400 ml. of anhydrous tetrahydrofuran previously cooled to 0° C. by means of an ice-bath. To the stirred and cooled phosgene-tetrahydrofuran solution was added 125 gms. (0.83 moles) of anhydrous L(+) tartaric acid dissolved in 800 ml. of anhydrous tetrahydrofuran. The resulting reaction mixture was stirred for an additional hour and thereafter allowed to warm to 15°–20° C. The mixture was then kept at this temperature for 18 hours. The resulting clear solution was subjected to reduced pressure and a temperature between 15°–20° C. until all of the tetrahydrofuran and the excess phosgene had distilled off. The remaining yellow syrup was taken up in 200 ml. of ethyl ether. After cooling the solution in an ice-bath, the white, crystalline precipitate was removed by filtration in a dry-box, washed with anhydrous cold diethyl ether, and dried in a vacuum oven maintained at 40° C. and 2 mm. Hg absolute pressure for 6 hours. The resulting crystalline product amounted to 75 grams (44.8% yield) and was shown by means of its elemental analysis, molecular weight, $CO_2$ evolution on contact with water and its infrared and nuclear magnetic resonance spectra, and its optical rotation to be L(+) bis-(anhydro-O-carboxy) tartaric acid.

While this invention has been described by reference to several specific examples employing lactic and tartaric acid, it is understood that the advantages of using the solvent system of this invention may be realized with other alpha-hydroxy acids such as a hydroxy-butyric, hydroxy-adipic, hydroxy-glutaric, malic, mandelic, etc.

What is claimed is:

1. An improved process for the production of O-carboxy anhydrides of alpha-hydroxy carboxylic acids which comprises dissolving an alpha-hydroxy carboxylic acid and phosgene in a solvent taken from the group consisting of tetrahydrofuran, and methyl derivatives thereof, maintaining said phosgene dissolved in an amount which is in excess of that required stoichiometrically for producing the anhydride; and reacting at temperatures below about 40° C. said acid with the phosgene for a period sufficient to provide the desired yield of the anhydride.

2. The process of claim 1 wherein the solvent and unreacted phosgene are distilled from the reaction mixture to terminate production of the anhydride.

3. The process of claim 1 wherein the acid is lactic acid.

4. The process of claim 1 wherein the acid is tartaric acid.

5. The process of claim 3 wherein the acid and the phosgene are reacted at 0°–10° C. for a period of 3–6 hours.

6. The process of claim 4 wherein the acid and the phosgene are reacted at 0°–20° C. for a period of 16–24 hours.

7. The process of claim 1 wherein the reaction mixture is substantially anhydrous.

8. The process of claim 5 wherein the excess phosgene and the solvent are removed by vacuum distillation at a temperature of 30°–40° C.

9. The process of claim 5 wherein the excess phosgene and the solvent are removed by vacuum distillation at a temperature of 15°–20° C.

References Cited by the Examiner

UNITED STATES PATENTS 2,910,483  10/1959  Schnell et al. _____ 260—340.2

FOREIGN PATENTS 650,003  2/1951  Great Britain.

WALTER A. MODANCE, *Primary Examiner.*

NICHOLAS S. RIZZO, *Examiner.*